United States Patent [19]

Jarvinen et al.

[11] Patent Number: 4,697,126
[45] Date of Patent: Sep. 29, 1987

[54] CONTROL METHOD FOR DIRECT CURRENT MOTOR

[75] Inventors: W. Bruce Jarvinen; Stephen J. Lukas, both of Roanoke, Va.

[73] Assignee: General Electric Company, Salem, Va.

[21] Appl. No.: 359,962

[22] Filed: Mar. 19, 1982

[51] Int. Cl.$^4$ .................................................. G05B 5/00
[52] U.S. Cl. .................................. 318/331; 318/345 C; 318/461
[58] Field of Search ............... 318/393, 436, 430, 309, 318/310, 345 E, 345 G, 345 C, 326, 327, 461–464, 448, 449, 301, 329, 314, 341, 311, 312, 315, 317, 400

[56] References Cited

U.S. PATENT DOCUMENTS

| | | | |
|---|---|---|---|
| 3,902,109 | 8/1975 | Speth et al. | 318/341 X |
| 4,249,236 | 2/1981 | Omae et al. | 318/345 C X |
| 4,362,976 | 12/1982 | Fujioka et al. | 318/341 |

Primary Examiner—Ulysses Weldon
Attorney, Agent, or Firm—Arnold E. Penner

[57] ABSTRACT

A method of controlling a direct current motor operating in an essentially no torque, discontinuous current mode provides for delivering current pulses to the motor of alternate relative polarity so as to position the motor to rapidly respond to a command signal for torque output. A steering strategy relative to the converters supplying current to the motor prevents a current reversal if the command signal is changing in a direction which would result in increased current to the motor in the direction of the last converter conduction.

8 Claims, 5 Drawing Figures

CONTROL METHOD FOR DIRECT CURRENT MOTOR

BACKGROUND OF THE INVENTION

The present invention relates generally to direct current (dc) motor drives and more particularly to a method of controlling a high performance dc motor operating in an essentially no-load (no torque) mode of operation so as to position the drive to be ready to be able to rapidly respond to demands for high torque without causing undue surges in motor current.

There is, of course, a large variety of dc motor drives many of which use controlled rectifier (e.g., silicon controlled rectifier) bridges to supply electrical current to the motor. When bi-directional motor operation is desired, two such bridges (usually called the forward and reverse bridges) connected in an anti-parallel relationship are often used so that current can be supplied to the motor in either direction in accordance with the direction of motor rotation desired.

An additional common feature in dc motor drives of the type being described is the use of an integrating circuit which receives a command signal representing the desired level of motor operation and a feedback signal representative of the motor terminal voltage. These two signals are combined and the integrated output of the combination serves as the signal for controlling the electrical power furnished to the motor. This integrating assists in stabilizing the system and tends to limit the rate of change of motor current. While the use of the integrating circuit alone does, in the overall sense, lend stability to the system, it also results in a form of instability when the motor is very lightly loaded (i.e., providing little or no torque to the load). The condition which can exist in this light load situation is that the integrating circuit has a tendency to drift and thus provide erroneous command signals to the bridge control circuits. One known way of preventing this drift is to program the firing (rendering conductive) of the bridge rectifiers so that very small amounts of current are furnished to the motor alternately from the forward and reverse bridges. This alternate firing of the forward and reversed bridges adequately stabilizes the integrator and works well for low performance systems. In high performance systems, however, where rapid changes in motor operation are required, problems can develop in this system. This is particularly true in digital type systems where decisions as to which bridge will next be fired must be made in sufficient time to permit the calculation of the appropriate firing angles. When the bridge is in this alternating firing mode, the problem which occurs is that the voltage command signal, which governs the firing circuit, is near a zero torque level until such time as increased torque is required in the motor. If the firing circuit which controls the actual conduction of the bridges has just committed to firing cells in a direction opposite to that which the command signal will be requesting, it will not be able to respond to the actual command voltage until another firing occurs in the committed direction. That is, the bridge representing the committed direction would first fire before the bridge which provides current in the desired direction would be permitted to fire.

During this interim period, the integrating circut earlier described would be continuing its integration process and the relatively long period involved might well be such that the integrated value would be sufficiently large to command an excess current from the firing of the desired bridge. Even if the resulting current were not large enough to cause damage by blowing fuses or destroying bridge thyristors, it might cause a current response which would command a lower current throwing the overall system into an oscillatory condition which may eventually cause a fault due to overcurrent.

SUMMARY OF THE INVENTION

It is, therefore, an object of the present invention to provide an improved dc motor drive system control.

It is another object to provide a control method for a bi-directional high performance dc motor drive which is stable and which operates in a reversing mode during periods of very low torque requirement.

It is a further object to provide, in a dc motor drive system of the reversing type at low torque requirements, a method of steering the application of power to the motor in a manner to permit rapid transition to a higher torque motor output.

It is a still further object to provide a method of controlling a dc motor in a low torque mode so as to permit transition to a high torque mode of operation without large current surges and fault conditions.

The foregoing and other objects are achieved, in accordance with the present invention, by a strategy in which the reversal procedure of the bridge is not allowed if the signal which commands the bridge operation is changing in a direction which would cause increased current from the converter which was last fired. That is, when the motor current is in the discontinuous mode, a command signal is compared with an indicium of the signal which was last used to render a bridge conductive and, as a result of this comparison (differencing), an evaluation is made on basis of the comparison which determines the permissibility of rendering a one of the bridges conductive.

BRIEF DESCRIPTION OF THE DRAWING

While the present invention is described in particularity in the claims annexed to and forming a part of this specification, a better understanding of the invention can be had by reference to the following description taken in conjunction with the accompanying drawing in which:

DETAILED DESCRIPTION

Figure 1:
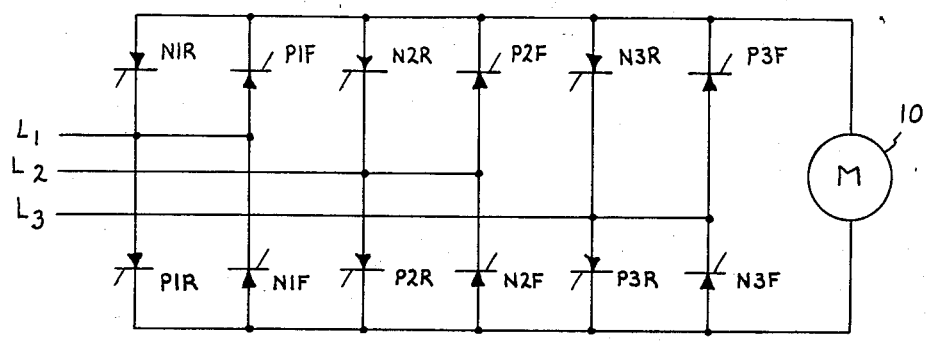
FIG. 1 is a schematic diagram showing the power connections of two anti-parallel connected rectifier bridges to supply electrical current to a motor as is typical in the art.

Referencing now FIG. 1, there is shown a reversing power supply for a motor load 10 which is comprised of two controlled rectifier bridges (forward and reverse) which are connected in an anti-parallel relationship to a three-phase alternating current (ac) source represented by the lines $L_1$, $L_2$ and $L_3$. In the depiction of FIG. 1, each of the controlled rectifiers (hereinafter referred to as thyristors) is defined by a three-character designation which denotes its positive or negative relationship with respect to a bridge, its connection to the source and whether it belongs to the forward or reverse bridge. For example, the three-character designation N1R means that that thyristor is in the negative half of a bridge, it is connected to line $L_1$ and belongs to the reverse bridge. Similarly, the designation P2F designates that that particular thyristor is in the positive half of a bridge, that it is connected to line $L_2$ and it belongs to the forward bridge. As is well known in the art, by controlling the time at which the various thyristors of the bridges are fired (rendered conductive) with respect to the phase relationship of the input ac source, the power can be controlled in magnitude and direction to motor load 10 to thus cause the dc motor to run in either direction at a desired speed. Since this type of bridge operation is basically well known in the art, further description is not believed here necessary.

Figure 2:
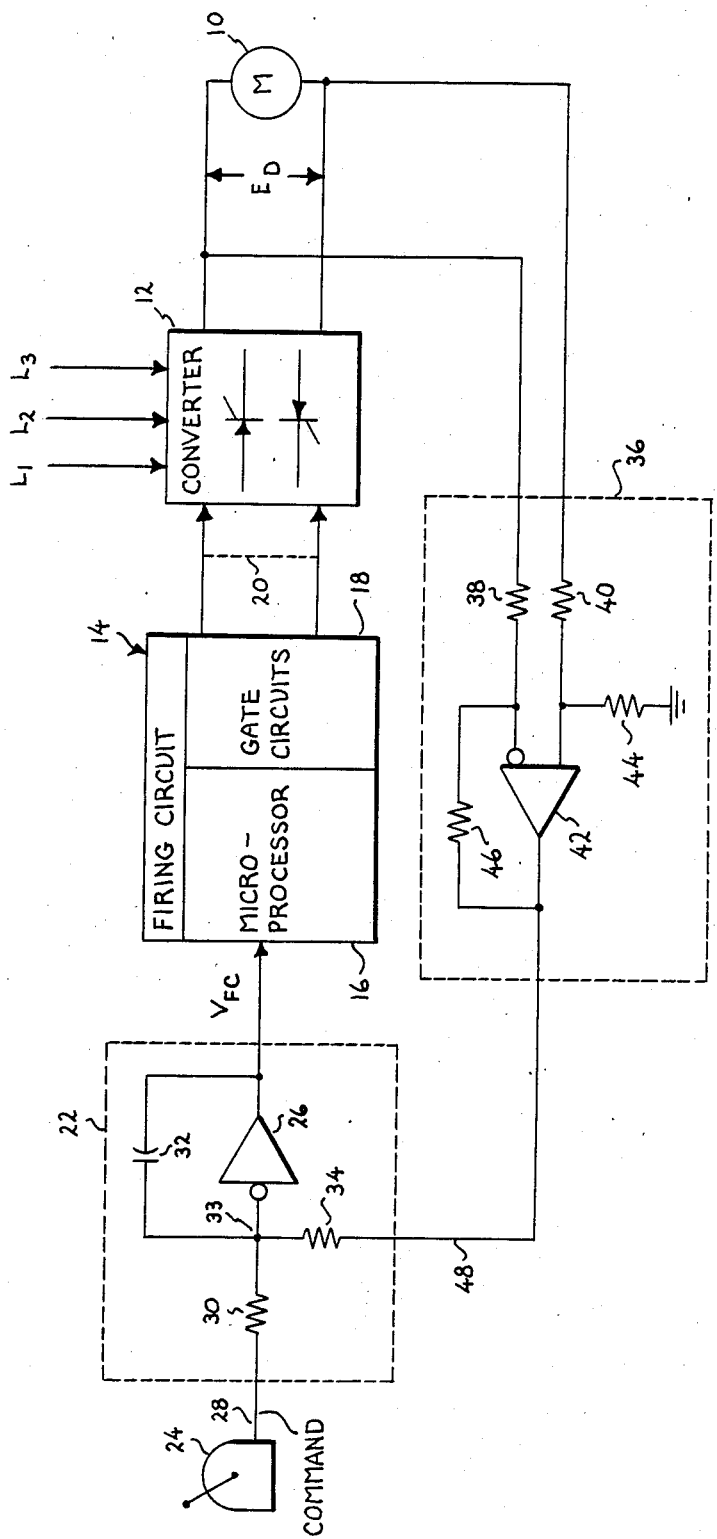
FIG. 2 is a schematic diagram, partially in block form, showing a typical motor drive such as might incorporate the present invention.

Referring now to FIG. 2, there is shown a typical control scheme such as might employ the present invention. As illustrated in FIG. 2, the motor load 10 is supplied with a terminal voltage $E_D$ from a bidirectional power converter 12 which may be the two bridges illustrated in FIG. 1. As illustrated, the converter 12 receives ac power via lines $L_1$, $L_2$ and $L_3$ and is under the control of a firing circuit 14. The firing circuit, as will be more fully understood as this description proceeds, includes a suitable microprocessor (e.g, an Intel 8748 microprocessor) which in response to an input signal (to be described) generates appropriate signals to be applied to gating circuits 18 such that the outputs of those circuits on lines 20 are applied to the various gate electrodes of the thyristors within the converter 12. This type of operation is that which is well known and is what is commonly called phase control. The microprocessor section is programmed to calculate the appropriate time of thyristor firing, with respect to the voltage on the input lines $L_1$, $L_2$ and $L_3$, to provide the desired power to the motor. In FIG. 2, the signal controlling the firing time is labelled $V_{FC}$ and is applied to the firing circuit 14 as the output of a suitable integrating circuit 22.

The integrating circuit 22 receives a command signal from a suitable source which, in the present embodiment, is illustrated as a control 24 which provides the command signal on line 28. In this case the command signal is a voltage signal having a value proportional to the desired voltage to be supplied to the motor. The signal on line 28 is applied by way of a resistor 30 to the inverting input of an operational amplifier 26. Operational amplifier 26 has a capacitor 32 connected between its output and its inverting input and receives, at that inverting input, a second signal by way of a resistor 34. As is known, the output of the operational amplifier 26, that is the output of the integrating circuit 22 (control signal $V_{FC}$), will be the integral of the inputs as applied by way of resistors 30 and 34. A feedback signal representative of the motor terminal voltage $E_D$ is derived by applying that voltage to a suitable isolation circuit 36. As illustrated, the $E_D$ signal is applied by way of two resistors 38 and 40, respectively, to the inverting and non-inverting inputs of an operational amplifier 42 whose non-inverting input is also connected to ground by way of resistor 44. A feedback resistor 46 is connected between the output and the inverting input of operational amplifier 42. As such, there appears on line 48, the output of the isolation circuit 36, a signal which is proportional to the motor terminal voltage which signal is applied by way of resistor 34 to the operational amplifier 26.

From the showing in FIG. 2, it is seen that the integrating circuit 22 receives a command signal from the input 24. (It should be noted that while a manually operable input is illustrated, this input could, of course, be derived from any suitable source such as other logic circuitry, a computer or other regulator stages.) This command signal is combined at node 33 with the feedback signal proportional to motor terminal voltage and this combined signal will be integrated to serve as the control signal $V_{FC}$. The $V_{FC}$ signal is converted to a digital number and applied to the microprocessor 16 of the firing circuit 14 which uses that signal in any acceptable known manner (e.g. by a biased cosine firing strategy) to control the gate circuits 18 which, in turn, control the firing of the thyristors of the converter 12.

As will be understood, the present invention is applicable only when the motor current is discontinuous. One method of determining discontinuous current would be to place some form of current sensor in the lines which connect the converter 12 to the motor load 10. Such current sensors are, however, often very expensive particularly when, as in this case, the currents attempted to be sensed are very small and, because of the inductive nature of the load, tend to include a large amount of voltage transients. One alternate method of determining discontinuous currents is to sense those times when all of the thyristors in the bridges are non-conducting. One suitable means for performing this function is illustrated in FIG. 3.

Figure 3:
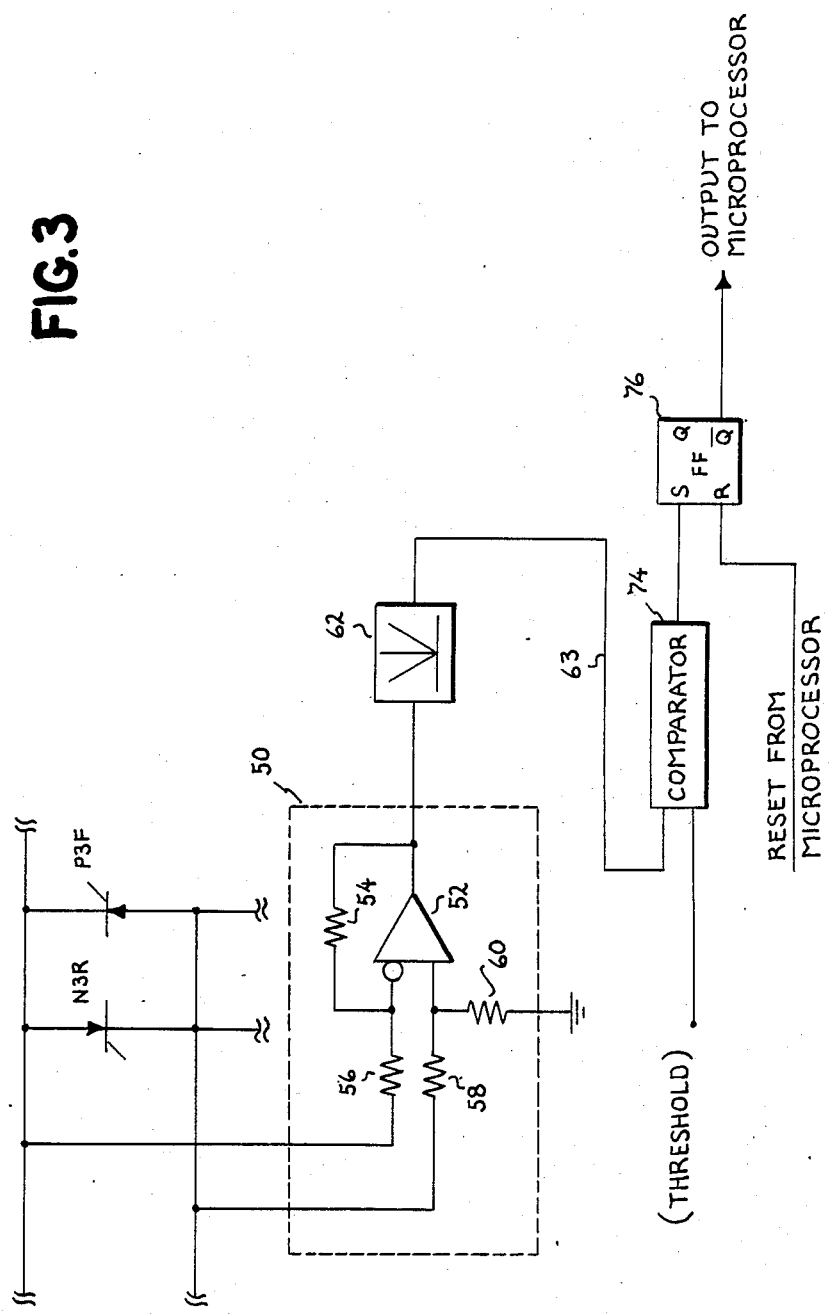
FIG. 3 is a schematic diagram illustrating one possible scheme for detection of discontinuous current such as might be used with the present invention.

As shown in FIG. 3, the voltage across a pair of thyristors, (e.g., thyristor pair N3R and P3F) is applied to a differential amplifier circuit 50. This circuit 50 includes an operational amplifier 52 having a feedback resistor 54 connected between its output and its inverting input. The voltage across the two thyristors is applied to the inputs of the operational amplifier by way of suitable scaling resistors 56 and 58. The non-inverting input of amplifier 52 is further connected to ground by way of a resistor 60. The output of the differential amplifier circuit 50 is applied to an absolute value circuit 62. Absolute value circuit 62 is typical of those known in the art. Thus, the output of the circuit 62 (line 63) will be a positive signal of suitable magnitude whenever the thyristor voltage, as sensed by the differential amplifier circuit 50, is of a value of sufficient magnitude to indicate that neither of the thyristors N3R and P3F is conducting. The output on line 63 serves as one input to a suitable comparator circuit (which may also be of a differential amplifier of the operational amplifier type) which receives as a second input a threshold voltage having a magnitude corresponding to that which will be on line 63 when neither of the thyristors N3R and P3F is conducting. Thus, whenever the output on line 63 exceeds this threshold value, comparator 74 will provide a positive output signal to the set (S) input of a suitable flip-flop (monostable multivibrator) 76 to place that flip-flop in its set state. The reset (R) terminal of flip-flop 76 receives a reset signal from microprocessor 16 (FIG. 2). The reset signal from the microprocessor is provided each time firing signals are provided to the converter 12 (FIG. 2). Thus it is seen that if, at any time between successive firings of any of the thyristors of the converter 12, the voltage across the two thyristors exceeds the specified threshold value indicating that both thyristors are simultaneously non-conductive, the flip-flop 76 will set resulting in the $\overline{Q}$ output of that flip-flop being a binary zero.

Each pair of thyristors of converter 12 will have a conduction state detector as depicted in FIG. 3. Thus, microprocessor 16, by looking at all six such detectors may determine that all thyristors were non-conducting during a prescribed period of time by looking at the respective $\overline{Q}$ outputs from the six flip-flops. If all the $\overline{Q}$ outputs are binary zeros, the current has been discontinuous during that period of time.

Figure 5:
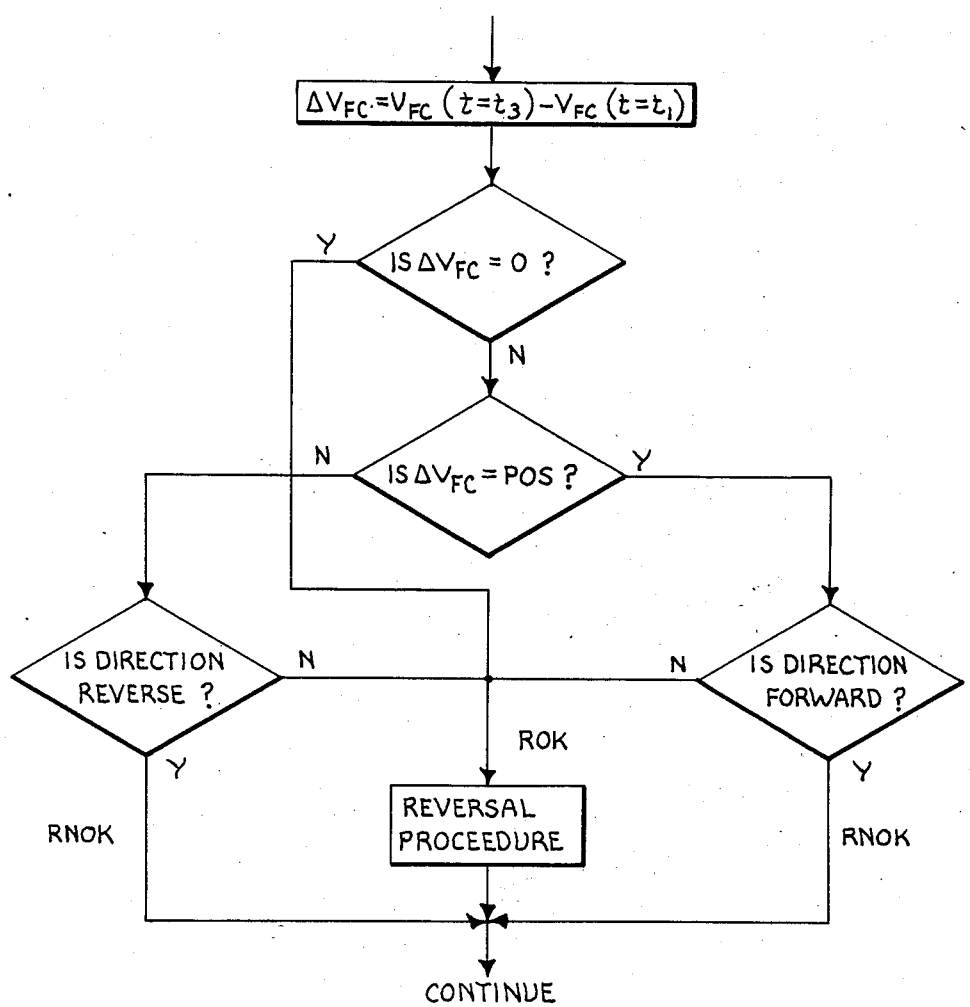
Figure 4:
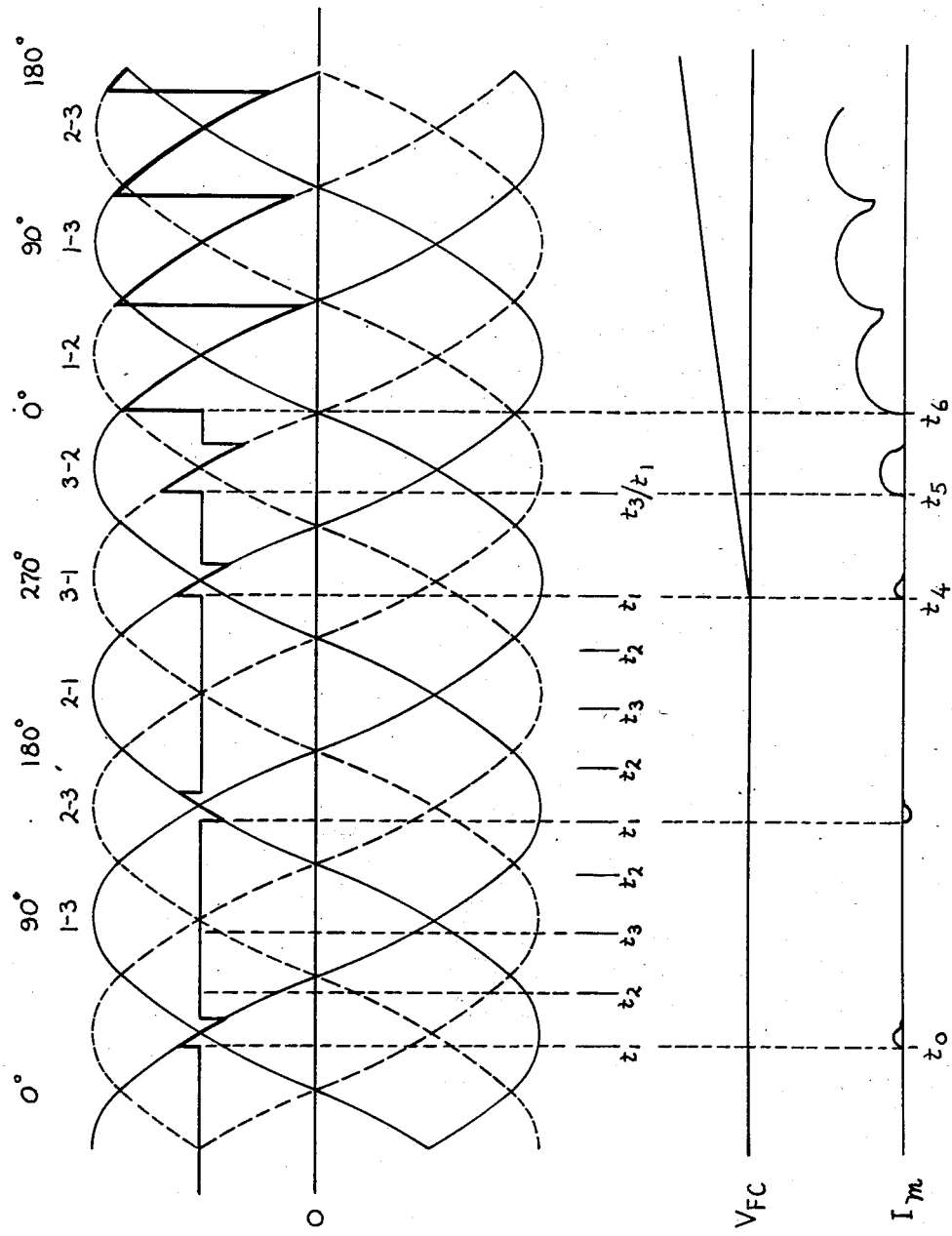
FIG. 4 includes graphical illustrations helpful in understanding the present invention; and, FIG. 5 is a flow chart illustrating the basic method of the present invention in its preferred embodiment.

Having described a suitable environment for the application of the present invention, reference is now made to FIGS. 4 and 5 and to the listing which is attached hereto as Appendix A for an understanding of the present invention. Looking first to FIG. 4, the upper depiction shows, in lighter lines, the phase-to-phase voltages of lines $L_1$, $L_2$ and $L_3$ and, in heavier line, motor terminal voltage. In this particular instance, because of the position of the motor terminal voltage with respect to the phase-to-phase voltages, it is seen that the motor is rotating. (Were the motor stationary, the terminal voltage to the left of point $t_4$, would be along the zero axis.) Prior to time $t_5$, substantially no torque is being delivered by the motor. The middle trace in FIG. 4 is the control voltage $V_{FC}$ and the lower trace is a depiction of the motor current $I_M$. In the time period from $t_0$ to $t_4$ it is seen that very small pulses of current are alternately applied to the motor in opposite directions in accordance with the earlier description.

At each $t_1$ time, the following events occur. First, an interrupt timer in the microprocessor is set to generate an interrupt after some elapsed period of time. In one particular embodiment of the invention, this period is approximately 27 electrical degrees after time $t_1$. This time period was selected to be sufficient to allow the current to go to the discontinuous state, if such were to happen, and yet early enough to permit the microprocessor adequate time for computation of advanced firing angles if required. Also, at each $t_1$ time the control voltage $V_{FC}$ is read from a suitable analog-to-digital converter (not shown) and that value is then stored in a memory location designated VRROLD (see Appendix A). In addition, the selected cells within the converter 12 of FIG. 2 are fired in accordance with the previously calculated firing angle to produce the small voltage pulse illustrated and the thyristor sensor flip-flops 76 (FIG. 3) are reset.

At each $t_2$ time, the following events occur. First of all, the thyristor sensor flip-flops are read. If the current is not continuous at this time, a flag is set to indicate discontinuous operation. (This flag may be merely a particular bit in a specified memory location.) Also at this time, the command voltage $V_{FC}$ is again read from the analog-to-digital converter to initiate computations as to which thyristors are to be fired and the time of firing. This time-to-fire information will be used to load a counter for the next firing interrupt which will occur at time $t_3$. For this operating mode (constant $V_{FC}$) time $t_3$ will occur approximately 60 electrical degrees after the occurrence of time $t_1$. The sensor flip-flops are again reset.

At all times marked $t_3$, all thyristor sensor flip-flops are read. If all thyristors were off, i.e., all $\overline{Q}$ outputs are a binary zero, and the discontinuous flag is set, then a reversal is permitted. If all thyristors are not indicated as being off, or if the discontinuous flag was not set, then the current was not discontinuous and the normal thyristor firing is required. If a reversal is permitted, the steering logic of the present invention is next executed. The command signal $V_{FC}$ is read from the analog-to-digital converter and compared with the stored value of $V_{FC}$ in location VRROLD. (The new value is stored in the VRROLD location for a next pass through the program). The difference between the new $V_{FC}$ reading ($V_{RR}$) the previously stored value in location VRROLD is a signal designated $\Delta V_{FC}$ which is evaluated to provide the following determinations:

(1) $\Delta V_{FC}$ = zero, reversal is permitted.

(2) $\Delta V_{FC}$ is positive and direction is forward. Do not reverse, but fire cells in the same direction. If direction is reverse, a reversal will be made.

(3) $\Delta V_{FC}$ is negative and direction is reverse. Do not reverse. If direction is forward, a reversal will be made.

In the situation to the left of time in $t_4$, the change in $V_{FC}$ signal was zero and therefore reversal was permitted. At time $t_4$ the $V_{FC}$ signal begins to move in a positive direction indicating that torque output from the motor is required. Thus, it is seen that at times $t_5$ and $t_6$ the discontinuous condition would allow a reversal but the steering logic would not since $\Delta V_{FC}$ is increasing and the direction is forward. After time $t_6$ current becomes continuous and firing in the forward direction is carried out in a normal manner.

The lower trace in FIG. 4 shows the motor current. It is seen that small currents of opposite directions were provided to the motor at each of first two $t_1$, times but that after time $t_5$ the motor current begins to grow and subsequently becomes continuous after time $t_6$.

The flow chart of FIG. 5 illustrates the operation described and it is seen that in the upper block the $\Delta V_{FC}$ value is calculated. It is then determined whether $\Delta V_{FC}$ is zero, and if so, the reversal earlier described is permitted. If it is not zero, then depending upon its relative polarity, positive or negative, one branch or the other is taken to the decision blocks as to direction. (By direction is meant that bridge which was last fired.) According to the output of these decision blocks, a reversal may or may not be permitted. In any case, the value of $V_{FC}$ will determine the firing angle with the decision as to which of the forward or reverse bridges being used being made in accordance with the present invention.

Appendix A attached hereto and forming a part of this specification shows an actual program for use in the implementation of the present invention employing an Intel 8748 microprocessor. The legend immediately below the program lists the terminology used in the program.

While there has been shown and described what is at present considered to be the preferred embodiment of the present invention, modifications thereto will readily occur to those skilled in the art. It is not desired, therefore, that the invention be limited to these specific methods as shown and described and it is intended to cover in the appended claims all such modifications as fall within the true spirit and scope of the invention.

APPENDIX A

| PROGRAM ADDRESS | PROGRAM DATA AT ADDRESS | PROGRAM LINE | PROGRAM INSTRUCTION; | COMMENTS |
|---|---|---|---|---|
| | | = 653 REVCK: | | |
| 06B5 | 74EB | = 654 | CALL VRRCNV | ;A & R2 < = VRRNEW |
| 06B7 | B915 | = 655 | MOV R1,#VRROLD | |
| 06B9 | 21 | = 656 | XCH A,@R1 | ;VRROLD < = A, A < = VRROLD |
| 06BA | 37 | = 657 | CPL A | |
| 06BB | 17 | = 658 | INC A | |
| 06BC | 61 | = 659 | ADD A,@R1 | ;A < = (VRRNEW-VRROLD) |
| 06BD | C6CB | = 660 | JZ ROK | |
| 06BF | B920 | = 661 | MOV R1,#BRIDG | |
| 06C1 | F2C8 | = 662 | JB7 PSCK | ;POS. DIFF. (INCR VRR) |
| 06C3 | F1 | = 663 | MOV A, @R1 | ;NEG. DIFF. (DECR VRR) |
| 06C4 | F2CB | = 664 | JB7 ROK | ;(FOR & DECR VRR)-DO REV |
| 06C6 | C4CD | = 665 | JMP RNOK | |
| | | = 666 PSCK: | | |
| 06C8 | F1 | = 667 | MOV A,@R1 | |
| 06C9 | F2CD | = 668 | JB7 RNOK | ;(FOR & INCR VRR)-DO NOT REV |
| | | = 669 ROK: | | |
| 06CB | 045F | = 670 | JMP RDCSD+2 | |
| | | = 671 RNOK: | | |
| 06CD | 24C9 | = 672 | JMP ENDAR | |

LEGEND
VRROLD = $V_{FC}(t = t_1$ in FIG. 4)
VRRNEW = $V_{FC}(t = t_3$ in FIG. 4)
BRIDG BIT 7 = 0: REVERSE DIRECTION
BRIDG BIT 7 = 1: FORWARD DIRECTION
ENDAR IS CELL FIRING PROGRAM
SETFL + 2 IS REVERSAL PROGRAM
VRRCNV IS A SUBROUTINE THAT READS THE VALUE OF $V_{FC}$ FROM THE A/D CONVERTER. The A/D CONVERTER GIVES THE COMPLEMENT OF THE ACTUAL; THEREFORE, THE SIGNS OF THE SUBTRACTIONS ARE COMPLEMENTED.

What is claimed is:

1. In a direct current motor drive system of the type in which motor current is supplied to the motor from a three-phase alternating current source by way of first and second rectifying bridges controlled to supply said current in an alternating fashion to the motor in low torque situations, an improved method of controlling said bridges comprising the steps:
   (a) providing a command signal indicative of a desired level of motor operation;
   (b) providing a feedback signal proportional to motor terminal voltage;
   (c) combining said command signal and said feedback signal to derive a combined signal;
   (d) integrating said combined signal to provide a control signal;
   (e) determining if the motor current is discontinuous; and,
   (f) determining, when said motor current is discontinuous, whether a first of said bridges may be rendered conductive next after a second of said bridges was rendered conductive comprising the steps of,
      (1) retaining an indicium of said second bridge which was last rendered conductive,
      (2) determining the difference in valve in said control signal at the approximate time that said second bridge was last rendered conductive and a time subsequent thereto; and,
      (3) evaluating on the basis of said retained indicium and the difference in value in said control signal, the permissibility of next rendering said first bridge conductive; and,
   (g) permitting rendering said first bridge conductive only if determined permissible.

2. The invention in accordance with claim 1 wherein each of said bridges includes a plurality of controlled rectifiers and wherein the step of determining if the motor current is discontinuous comprises the step of determining, at at least one prescribed time with respect to the phase of the alternating current ac source, whether all of the rectifiers of said bridges are in a non-conducting state.

3. The invention in accordance with claim 1 wherein said step of evaluating the permissibility of rendering said first bridge conductive includes:
   (a) determining the direction of change in the value of said control signal; and
   (b) determining that the rendering of said first bridge is permissible if the direction of change is zero or corresponds to the direction of motor current achieved by a rendering of said first bridge conductive.

4. The invention in accordance with either claim 1 or 3 wherein, with respect to determining the difference in value in said control signal, said time subsequent is approximately sixty electrical degrees after said second bridge was last rendered conductive.

5. In a direct current motor drive system of a type including forward and reverse controlled rectifier bridges for selectively supplying forward and reverse currents to a direct current motor and in which the forward and reverse bridge are alternately rendered conductive to supply currents of small magnitude to said motor when said motor is in a mode of operation of supplying essentially low torque, a method of determining whether the forward bridge may be safely rendered effective after the last rendering conductive of the reverse bridge comprising the steps of:
   (a) providing a command signal indicative of a desired level of motor operation;
   (b) providing a feedback signal proportional to motor terminal voltage;
   (c) combining said command signal and said feedback signal to derive a combined signal;

(d) integrating said combined signal to provide a control signal;

(e) determining if the motor current is discontinuous; and, (f) determining the difference in value in said control signal at the approximate time that reverse bridge was last rendered conductive and at a time subsequent thereto;

(g) permitting the rendering effective of said forward bridge in the event said difference in value is essentially zero or has a positive value.

6. The invention in accordance with claim 5 wherein, with respect to determining the difference in value in said control signal, said time subsequent is approximately sixty electrical degrees after said reverse bridge was last rendered conductive.

7. In a direct current motor drive system of the type including forward and reverse control rectifier bridges for selectively applying forward and reverse currents to a dc motor and in which the forward and reverse bridges are alternately rendered conductive to supply current of small magnitude to said motor when said motor is in a mode of operation of supplying essentially no torque, a method of determining whether the reverse bridge may be safely rendered effective after the last rendering conductive of the forward bridge comprising the steps of:

(a) providing a command signal indicative of a desired level of motor operation;

(b) providing a feedback signal proportional to motor terminal voltage;

(c) combining said command signal and said feedback signal to derive a combined and signal;

(d) integrating said combined signal to provide a control signal;

(e) determining if the motor current is discontinuous;

(f) determining the difference in value in said control signal at the approximate time the forward bridge was last rendered conductive and at a time subsequent thereto; and, (g) permitting the rendering effective of said reverse bridge in the event said difference in value is of essentially zero or has a negative value.

8. The invention in accordance with claim 7 wherein with respect to determining the difference in value in said control signal, said time subsequent is approximately sixty electrical degrees after said forward bridge was last rendered conductive.

* * * * *